(12) United States Patent
Nishida (10) Patent No.: US 7,852,056 B2
(45) Date of Patent: Dec. 14, 2010

(54) SWITCHING REGULATOR

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 387 days.

(21) Appl. No.: 12/140,910

(22) Filed: Jun. 17, 2008

(65) Prior Publication Data

US 2008/0315850 A1    Dec. 25, 2008

(30) Foreign Application Priority Data

Jun. 20, 2007    (JP) .............................. 2007-162107

(51) Int. Cl.
*G05F 1/40*    (2006.01)
(52) U.S. Cl. ...................................... 323/282
(58) Field of Classification Search ................. 323/265, 323/282, 283, 284, 351
See application file for complete search history.

(56) References Cited

U.S. PATENT DOCUMENTS

| | | | |
|---|---|---|---|
| 5,929,692 A * | 7/1999 | Carsten | 327/531 |
| 6,285,173 B1 * | 9/2001 | Bentolila et al. | 323/282 |
| 6,307,355 B1 * | 10/2001 | Nguyen | 323/271 |
| 7,319,311 B2 | 1/2008 | Nishida et al. | |
| 7,538,531 B2 * | 5/2009 | Ishii et al. | 323/282 |
| 7,633,278 B2 * | 12/2009 | Ohtake | 323/282 |
| 2007/0085585 A1 | 4/2007 | Frederick | |
| 2007/0176588 A1 | 8/2007 | Nishida | |
| 2007/0216389 A1 | 9/2007 | Nishida | |
| 2007/0285073 A1 | 12/2007 | Nishida | |

FOREIGN PATENT DOCUMENTS

JP    2005-124248    5/2005

\* cited by examiner

*Primary Examiner*—Adolf Berhane
(74) *Attorney, Agent, or Firm*—Dickstein Shapiro LLP

(57) ABSTRACT

A switching regulator includes an inductor, first and second switches, a first rectifier to allow current flowing from a negative voltage output terminal to a connection node between the inductor and the first switch, a second rectifier to allow current flowing from a positive voltage output terminal to a connection node between the inductor and the second switch, a third switch, a first capacitor connected between the negative voltage output terminal and ground, a second capacitor connected between the positive voltage output terminal and ground, and a controller to control switching operations of the first, second and third switches to make each voltages at the negative and positive voltage output terminals to be corresponding predetermined voltages. The control circuit switches the first and second switches on/off simultaneously to make a sum of absolute values of voltages at the negative and positive voltage output terminals a predetermined voltage value.

20 Claims, 6 Drawing Sheets

SWITCHING REGULATOR

This patent application claims priority from Japanese Patent Application No. 2007-162107 filed on Jun. 20, 2007 in the Japan Patent Office, the entire contents of which are hereby incorporated by reference herein.

BACKGROUND OF THE INVENTION

1. Field

This patent specification describes a switching regulator, and more particularly, a switching regulator capable of outputting positive and negative voltages.

2. Background Art

Recently, portable devices have become compact and are offering an increasing range of functions. For example, a mobile phone commonly mounts a digital camera as a standard function in addition to a primary function of a communication capability, i.e., transferring and receiving functions. Further, the mobile phone typically includes a variety of electric functional elements, such as a display panel using a liquid crystal display (LCD) and organic electroluminescence (EL), an image pickup device such as a charge-coupled device (CCD), and memories. For such mobile phone, a variety of voltages including positive and negative voltages are required to drive the electric functional elements described above. Further, there is market demand to make the mobile phone more compact and consume less power.

To generate both the positive and the negative voltages required, a variety of converters have been proposed, for example, a DC-DC converter that employs a plurality of inductors and a charge-pump-type converter that employs a plurality of capacitors. Using a plurality of inductors, it is possible to supply current for a large load, however, it is difficult to make the inductors compact. Further, an apparatus may increase in size because of the large room required for the plurality of inductors.

The charge-pump-type converter needs a lot of capacitors. Further, when a load current increases, a size of the capacitor must be increased in proportion to a necessary load current. For this reason, applications for the charge-pump-type converter are limited in the field of compact portable devices.

Figure 1:
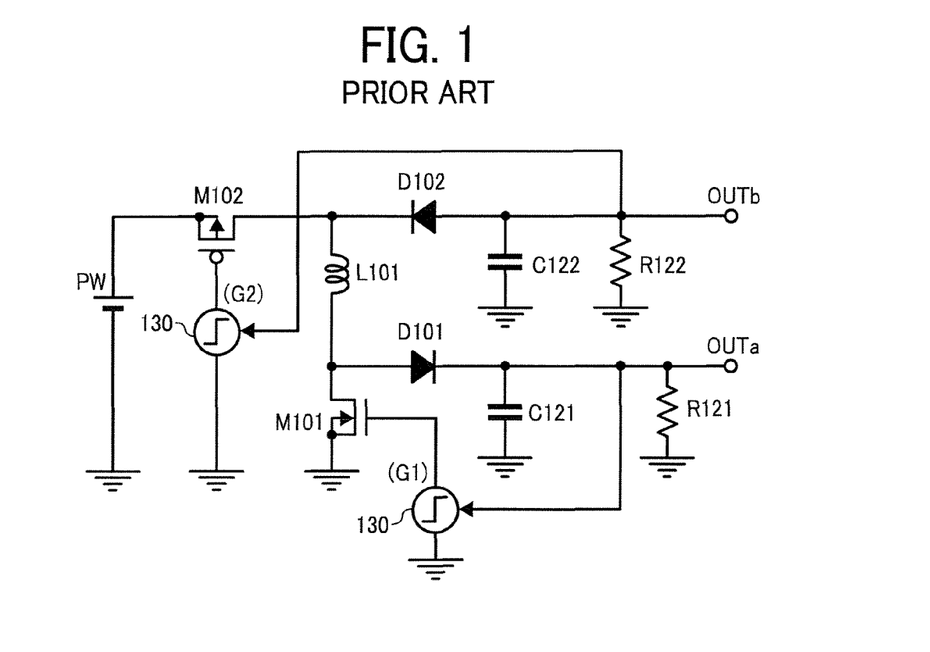
FIG. 1 is an circuit diagram showing an example of a known power supply circuit that generates both positive and negative voltages using a single inductor.

FIG. 1 illustrates an example of a power supply circuit that generates both the positive and the negative voltages using a single inductor. In FIG. 1, the power supply circuit includes an NMOS transistor M101, a PMOS transistor M102, diodes D101 and D102, an inductor L101, capacitors C121 and C122, resistors R121 and R122, and a timing pulse generator 130. When the PMOS transistor M102 is on to create a conduction state, the inductor L101, the NMOS transistor M101 and the diode D101 form a step-up switching regulator. Therefore, the power supply circuit performs a step-up operation by switching the NMOS transistor M101 on and off, and outputs a positive voltage from a positive voltage output terminal OUTa.

Meanwhile, when the NMOS transistor M101 is on to create a conduction state, the inductor L101, the PMOS transistor M102 and the diode D102 form a polarity-inversion-type switching regulator. The power supply circuit outputs a negative voltage from a negative voltage output terminal OUTb by switching the PMOS transistor M102 on and off.

Figure 2:
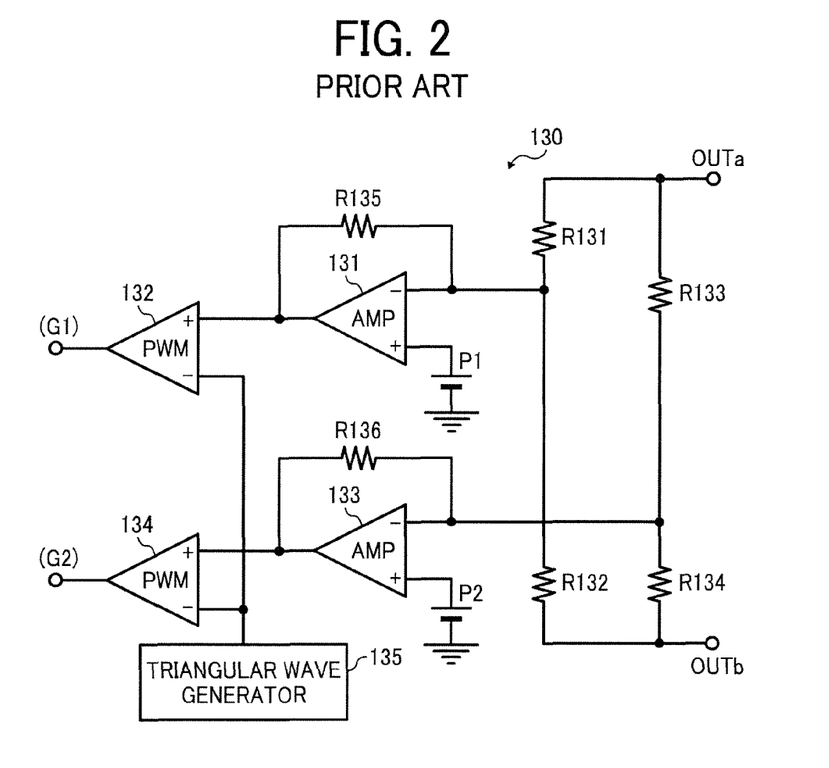
FIG. 2 is a circuit diagram of a timing pulse generator used in the power supply circuit of FIG. 1.

FIG. 2 is a circuit diagram of the timing pulse generator 130 shown in FIG. 1. The timing pulse generator 130 includes PWM comparators 132 and 134, operational amplifiers 131 and 133, a triangular wave generator 135, resistors R131, R132, R133, R134, R135 and R136, and reference voltage generators P1 and P2. The timing pulse generator 130 generates and outputs pulse signals G1 and G2 which drive the NMOS transistor M101 and the PMOS transistor M102, respectively. The operational amplifier 131 amplifies a voltage difference between a divided voltage divided by the resistors R131 and R132 and the reference voltage P1. The divided voltage divided by the resistors R131 and R132 is generated by dividing a voltage difference between a voltage at the positive voltage output terminal OUTa and a voltage at the negative voltage output terminal OUTb. The PWM comparator 132 generates the pulse signal G1 based on an amplified signal by performing PWM (pulse-width modulation) using a triangular wave generated by the triangular wave generator 135.

Similarly, the operational amplifier 133 amplifies a voltage difference between a divided voltage divided by the resistors R133 and R134 and the reference voltage P2. The divided voltage divided by the resistors R133 and R134 is generated by dividing a voltage difference between the voltage at the positive voltage output terminal OUTa and a voltage at the negative voltage output terminal OUTb. The PWM comparator 134 generates the pulse signal G2 based on an amplified signal by performing PWM using a triangular wave generated by the triangular wave generator 135.

When the pulse signal G1 is high and the pulse signal G2 is low, the NMOS transistor M101 and the PMOS transistor M102 are both on to create a conduction state so that the inductor L101 stores energy. When the pulse signals G1 and G2 are both low, the NMOS transistor M101 is off and the PMOS transistor M102 is on. Therefore, the energy stored in the inductor L101 is stored into the capacitor C121 that is connected between the positive voltage output terminal OUTa and ground, and is also output from the positive voltage output terminal OUTa.

When the pulse signals G1 and G2 are both high, the NMOS transistor M101 is on and the PMOS transistor M102 is off. The energy stored in the inductor L101 is stored into the capacitor C122 connected between the negative voltage output terminal OUTb and ground, and is also output from the negative voltage output terminal OUTb.

However, the power supply circuit shown in FIG. 1 uses the diodes as a rectifier, which causes a large voltage drop. Accordingly, power conversion efficiency is decreased especially when an output voltage of the power supply circuit is small. Further, as for the circuit configuration for outputting a positive voltage, it is not possible to output a small voltage smaller than the input voltage because the power supply circuit is a step-up voltage circuit.

SUMMARY

This patent specification describes a novel switching regulator that includes an inductor, first and second switches, a first rectifier to allow current flowing from a negative voltage output terminal to a connection node between the inductor and the first switch, a second rectifier to allow current flowing from a positive voltage output terminal to a connection node between the inductor and the second switch, a third switch, a first capacitor connected between the negative voltage output terminal and ground, a second capacitor connected between the positive voltage output terminal and ground, and a controller to control switching operations of the first, second and third switches to make each voltages at the negative and positive voltage output terminals to be corresponding predetermined voltages. The control circuit switches the first and second switches on/off simultaneously to make a summation of absolute values of voltages at the negative and positive voltage output terminals with a predetermined voltage value.

This patent specification further describes a novel control method used in the switching regulator. The control method includes switching the first and second switches on and off simultaneously to make a summation of absolute values of both voltages at the negative and positive voltage output terminals with a predetermined voltage value, and controlling operations of the first, second and third switches to make each voltages at the negative and positive voltage output terminals to be corresponding predetermined first and second voltages, respectively.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing certain preferred embodiments illustrated in the drawings, it is to be noted that specific terminology is employed solely for the sake of clarity. Accordingly, the disclosure of the present patent specification is not intended to be limited to the specific terminology so selected, and it is therefore to be understood that each specific element includes all technical equivalents that operate in a similar manner and achieve a similar result.

Referring now to the drawings, wherein like reference numerals designate identical or corresponding parts throughout the several views, switching regulators according to certain example embodiments are described.

First Example Embodiment

Figure 3:
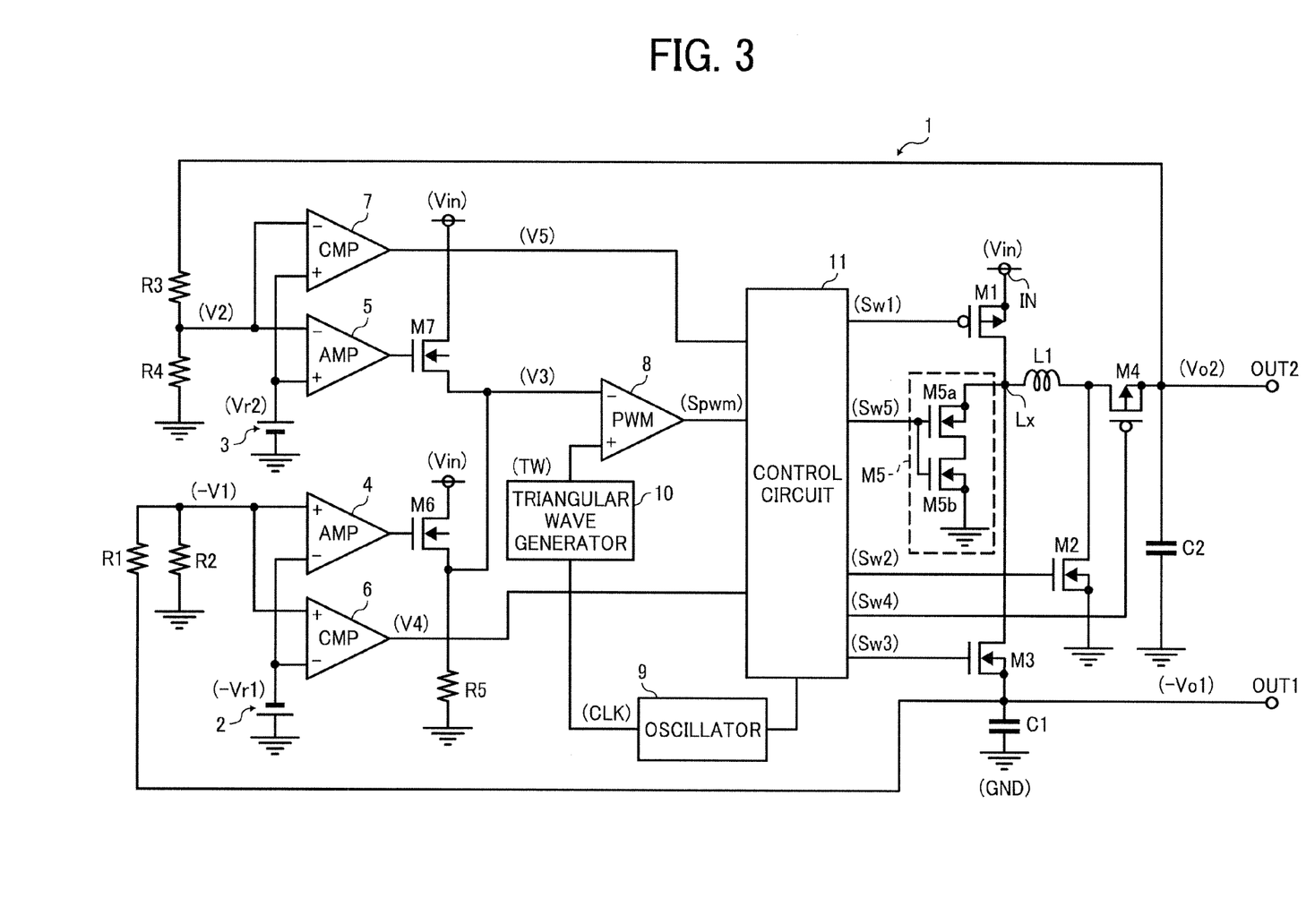
FIG. 3 is a switching regulator according to a first exemplary embodiment.

FIG. 3 illustrates a switching regulator 1 according to a first exemplary embodiment of the present invention.

The switching regulator 1 converts an input voltage Vin input at an input terminal IN to a predetermined negative voltage, and outputs the converted negative voltage as a negative output voltage −Vo1 from a negative output terminal OUT1. Further, the switching regulator 1 converts the input voltage Vin input at the input terminal IN to a predetermined positive voltage, and outputs the converted positive voltage as a positive output voltage Vo2 from a positive output terminal OUT2.

The switching regulator 1 includes an inductor L1, and first and second switches M1 and M2. The first switch M1 is a PMOS transistor, and stores energy in the inductor L1 in accordance with a control signal. The second switch M2 is an NMOS transistor, and stores energy in the inductor L1 and discharges the energy in accordance with a control signal. Further, the switching regulator 1 includes a third switch M3 which is an NMOS transistor, and a fourth switch M4 which is a PMOS transistor. The third and fourth switches M3 and M4 discharge the energy stored in the inductor L1 in accordance with control signals. Further, the switching regulator 1 includes a fifth switch M5 which is comprised of NMOS transistors M5a and M5b.

The switching regulator 1 includes resistors R1, R2, R3 and R4, capacitors C1 and C2, and first and second reference voltage generators 2 and 3. The resistors R1 and R2 generate a first divided voltage −V1 by dividing the negative output voltage −Vo1. The resistors R3 and R4 generate a second divided voltage V2 by dividing the positive output voltage Vo2. The first and second reference voltage generators 2 and 3 generate first and second reference voltages −Vr1 and Vr2, respectively.

The switching regulator 1 includes first and second error amplifiers 4 and 5, first and second comparators 6 and 7, a PWM comparator 8, an oscillator 9, a triangular wave generator 10, a control circuit 11, NMOS transistors M6 and M7, and a resistor R5. The oscillator 9 generates and outputs a predetermined clock signal CLK. The triangular wave generator 10 generates and outputs a predetermined triangular wave signal TW based on the clock signal CLK.

The third switch M3 forms a first rectifier, and the fourth switch M4 forms a second rectifier. The capacitor C1 forms a first capacitor, and the capacitor C2 forms a second capacitor. The first and second error amplifiers 4 and 5, the first and second comparators 6 and 7, the PWM comparator 8, the oscillator 9, the triangular wave generator 10, the control circuit 11, the NMOS transistors M6 and M7, and the resistors R1, R2, R3, R4, and R5 collectively form a control circuit unit. Specifically, the NMOS transistors M6 and M7 and the resistor R5 form an adder circuit. Further, the PWM comparator 8, the oscillator 9, and the triangular wave generator 10 collectively form a PWM comparator unit. The first divided voltage −V1 is defined as a first proportional voltage, and the second divided voltage V2 is defined as a second proportional voltage. Excepting the inductor L1 and the capacitors C1 and C2, all the circuit units may be integrated on a single chip.

Between the input voltage terminal IN and the negative voltage output terminal OUT1, the first and third switches M1 and M3 are connected in series. Between a connection node Lx, which is between the first and third switches M1 and M3, and the positive voltage output terminal OUT2, the inductor L1 and the fourth switch M4 are connected in series. Between the connection node Lx and ground, the fifth switch R5 is connected. In the fifth switch R5, the NMOS transistors M5a and M5b are connected in series.

Between a connection node between the inductor L1 and the fourth switch M4 and ground, the second switch M2 is connected. Between the positive voltage output terminal OUT2 and ground, the capacitor C2 is connected, and further, the resisters R3 and R4 are connected in parallel with the capacitor C2. The second divided voltage V2 is output from a connection node between the resisters R3 and R4.

Further, between the negative voltage output terminal OUT1 and ground, the capacitor C1 is connected and the resisters R1 and R2 are connected in parallel with the capacitor C1. The first divided voltage V1 is output from a connection node between the resisters R1 and R2.

The control circuit 11 outputs control signals SW1, SW2, SW3, SW4 and SW5. The control signal SW1 is input to a gate of the first switch M1, the control signal SW2 is input to a gate of the second switch M2, the control signal SW3 is input to a gate of the third switch M3, the control signal SW4 is input to a gate of the fourth switch M4, and the control signal SW5 is input to each gate of the NMOS transistors M5a and M5b. A substrate gate of the first switch M1 is connected to the input voltage terminal IN, a substrate gate of the second switch M2 is connected to ground, a substrate gate of the third switch M3 is connected to the negative voltage output terminal OUT1, and a substrate gate of the fourth switch M4 is connected to the positive voltage output terminal OUT2.

A substrate gate of the NMOS transistor M5a is connected to the connection node Lx, and a substrate gate of the NMOS transistor M5b is connected to ground. In this circuit, a drain of the NMOS transistor M5a can be a positive voltage and a negative voltage. With these connections, however, it is possible to avoid creation of a conduction path between the connection node Lx and ground through parasitic diodes formed at the NMOS transistors M5a and M5b even when the NMOS transistors M5a and M5b are both off. Accordingly, the substrate gate of the NMOS transistor M5a may be connected to a source of the NMOS transistor M5a, and the substrate gate of the NMOS transistor M5b may be connected to drain of the NMOS transistor M5b.

As for the first error amplifier 4, the first divided voltage −V1 is input to a non-inverted terminal, and the first reference voltage −Vr1 is input to an inverted terminal. The first error amplifier 4 amplifies a voltage difference between the first divided voltage −V1 and the first reference voltage −Vr1 input to the first error amplifier 4, and outputs an amplified voltage to a gate of the NMOS transistor M6. Between the input voltage terminal IN and ground, the NMOS transistor M6 and the resistor R5 are connected in series. A connection node between the NMOS transistor M6 and the resistor R5 is connected to an inverted input terminal of the PWM comparator 8.

As for the comparator 6, the first divided voltage −V1 is input to a non-inverted terminal, and the first reference voltage −Vr1 is input to an inverted terminal. The comparator 6 compares the first divided voltage −V1 with the first reference voltage −Vr1 input to the comparator 6, generates a binary output signal V4 that indicates a comparison result, and outputs the binary output signal V4 to the control circuit 11.

As for the second error amplifier 5, the second divided voltage V2 is input to an inverted terminal, and the second reference voltage Vr2 is input to a non-inverted terminal. The second error amplifier 5 amplifies a voltage difference between the second divided voltage V2 and the second reference voltage Vr2 input to the second error amplifier 5, and outputs an amplified voltage to a gate of the NMOS transistor M7. Between the input voltage terminal IN and the inverted terminal of the PWM comparator 8, the NMOS transistor M7 is connected.

As for the comparator 7, the second divided voltage V2 is input to an inverted input terminal, and the second reference voltage Vr2 is input to a non-inverted terminal. The comparator 7 compares the second divided voltage V2 with the second reference voltage Vr2 input to the comparator 7, generates a binary output signal V5 that indicates a comparison result, and outputs the binary output signal V5 to the control circuit 11.

The oscillator 9 generates a clock signal, and outputs the clock signal to the triangular wave generator 10. The triangular wave generator 10 generates a triangular wave TW, and outputs the triangular wave TW to a non-inverted input terminal of the PWM comparator 8. The PWM comparator 8 outputs a pulse signal Spwm, and inputs to the control circuit 11. Further, the clock signal generated by the oscillator 9 is input to the control circuit 11.

With this circuit configuration, when the switching regulator 1 turns the second and third switches M2 and M3 off and turns the fourth switch M4 on, the first and fifth switches M1 and M5 and the inductor L1 form a step-down switching regulator. Further, when the switching regulator 1 turns the first switch M1 on and turns the third and the fifth switches M3 and M5 off, the second and fourth switches M2 and M4 and the inductor L1 form a step-up switching regulator. Further, when the switching regulator 1 turns the second switch M2 on and turns the fourth and the fifth switches M4 and M5 off, the first and third switches M1 and M3 and the inductor L1 form a polarity-inversion-type switching regulator.

The NMOS transistor M6 converts an output voltage of the first error amplifier 4 to a current, and the NMOS transistor M7 converts an output voltage of the second error amplifier 5 to a current. Then, each current is added by the resistor R5 to generate a voltage V3. The voltage V3 is input to an inverted terminal of the PWM comparator 8. Consequently, the NMOS transistors M6 and M7 and the resistor R5 form an adder circuit that generates the voltage V3, which is proportional to the sum of the output voltages of the first and second error amplifiers 4 and 5. The voltage V3 represents a summation of the absolute values of the negative voltage −Vo1 and the positive voltage Vo2.

In this example circuit, the resistor R5 is used as an adder element. However, a constant current source may be used by replacing the resistor R5.

The PWM comparator 8 generates a pulse signal Spwm by modulating the voltage V3 input to the PWM comparator 8 using PWM, and outputs the pulse signal Spwm to the control circuit 11. Accordingly, the PWM comparator 8 outputs a pulse signal proportional to the sum of the absolute values of the negative voltage −Vo1 and the positive voltage Vo2.

Figure 4:
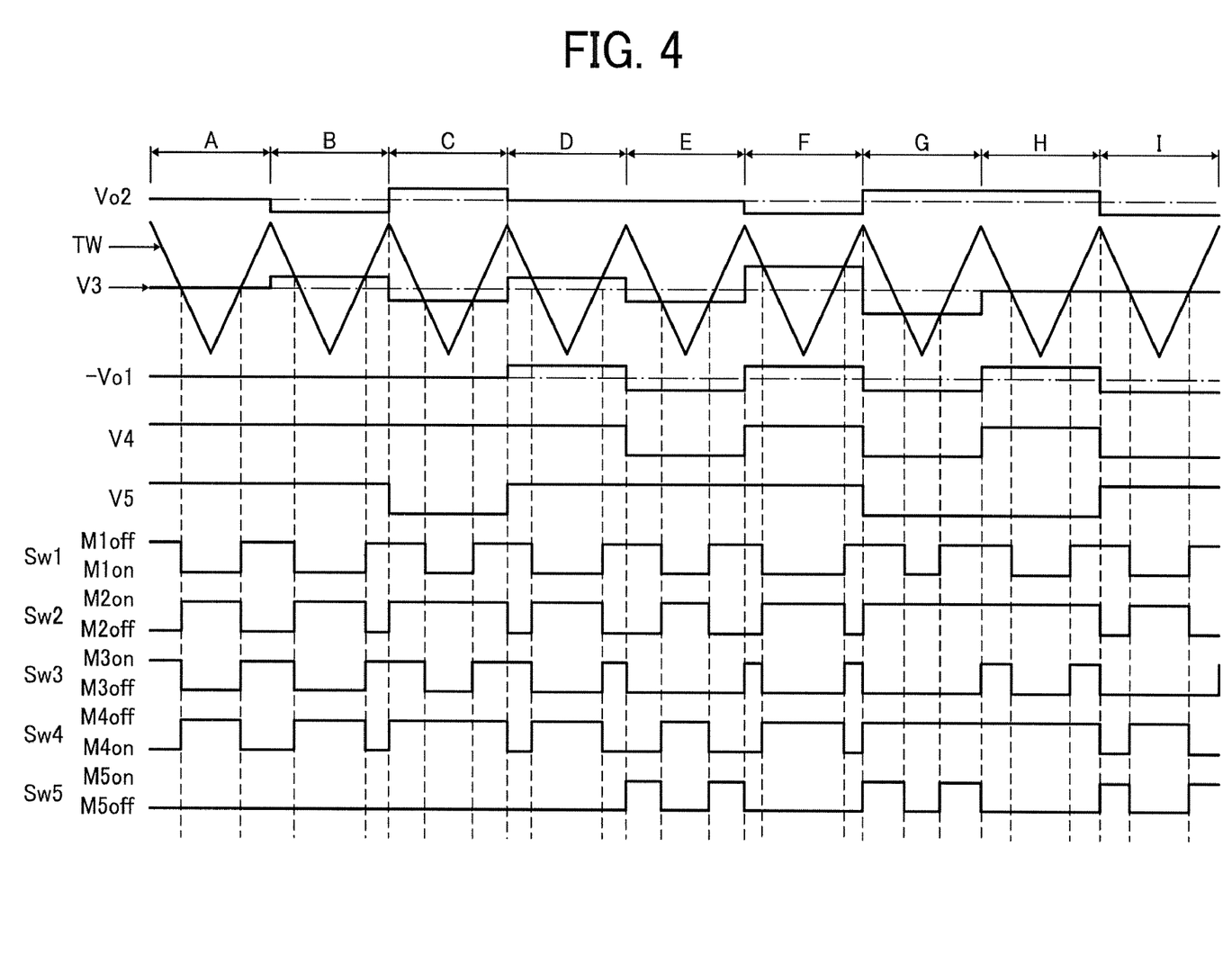
FIG. 4 is a timing chart showing each wave of the switching regulator 1 of FIG. 3.

FIG. 4 is a timing chart showing each wave of the switching regulator 1 shown in FIG. 3. Referring to FIG. 4, an operation of the control circuit 11 is now described.

In FIG. 4, one cycle of triangular wave TW is shown at each operating range "A" through "I" for simplicity. However, numerous variations are possible. Further, in FIG. 4, changes of the negative voltage −Vo1 and the positive voltage Vo2 at each boundary region of each operating range "A" through "I" are illustrated in a step-like form for simplicity. However, the negative voltage −Vo1 and the positive voltage Vo2 may change gradually based on the clock signal CLK having a plurality of actual clock timings. Further, an order of occurrence of each operating range "A" through "I" is not limited to that shown in FIG. 4, which is an arbitrary order, and numerous variations are possible.

The operating range "A" represents an operation at a steady state. The control circuit 11 outputs the control signals Sw1 to Sw5 to turn both the NMOS transistors M5a and M5b off, to switch the first and second switches M1 and M2 on and off simultaneously, to switch the third and fourth switches M3 and M4 on and off simultaneously and complementary to the first and second switches M1 and M2. An on-duty cycle Don of the first switch M1 during the operating range "A" is expressed by a formula, $$(Vo2-(-Vo1))/Vin=Don/(1-Don).$$

When left side of the formula is simplified, the formula will be expressed by a following formula (1), $$(Vo2+Vo1)/Vin=Don/(1-Don) \quad (1)$$

where Vin is input voltage.

Referring to the formula (1), it is found that the on-duty cycle Don determines the summation of the absolute values of the negative voltage −Vo1 and the positive voltage Vo2. In the operating range "A", each input terminal has a hysteresis mechanism to have a hysteresis voltage so that each of the output signals V4 and V5 of the comparators 6 and 7 can be both high.

The operating range "B" represents an operation where the positive voltage Vo2 is decreased for some reason. When the positive voltage Vo2 decreases, the second divided voltage V2 input to an inverted terminal of the second error amplifier 5 is decreased. Then, an output voltage of the second error amplifier 5 increases so that a gate voltage of the NMOS transistor M7 is increased. When the gate voltage of the NMOS transistor M7 increases, the drain current of the NMOS transistor M7 increases, resulting in increase of the voltage V3.

As a result, a low level portion of the pulse signal Spwm output from the PWM comparator 8 increases in width. The control circuit 11 increases each ratio of the low level portion of the control signal SW1 and the high level portion of the control signal SW2 so that the sum of the absolute values (Vo2+Vo1) of the negative voltage −Vo1 and the positive voltage Vo2 is increased. Within the operating range "B", the control circuit 11 keeps the NMOS transistors M5a and M5b off so that the fifth switch is turned off.

The operating range "C" represents an operation where the positive voltage Vo2 is increased for some reason. When the positive voltage Vo2 is increased, the output signal V5 output from the second comparator 7 is inverted and becomes a low level. Then, the control circuit 11 turns the second switch M2 on and turns the fourth switch M4 off so as to stop supplying energy to the capacitor C2. Accordingly, the positive voltage Vo2 is decreased. Further, since the second divided voltage V2 input to the inverted terminal of the second error amplifier 5 increases, the output voltage of the second error amplifier 5 decreases so that the gate voltage of the NMOS transistor M7 is decreased. When the gate voltage of the NMOS transistor M7 decreases, the drain current of the NMOS transistor M7 decreases, resulting in decrease of the voltage V3.

As a result, the low level portion of the pulse signal Spwm output from the PWM comparator 8 narrows. The control circuit 11 decreases a ratio of the low level portion of the control signal SW1 so that the sum of the absolute values (Vo2+Vo1) of the negative voltage −Vo1 and the positive voltage Vo2 is decreased. Within the operating range "C", the control circuit 11 keeps the NMOS transistors M5a and M5b off so that the fifth switch is turned off.

The operating range "D" represents an operation where the negative voltage −Vo1 is increased for some reason. When the negative voltage −Vo1 is increased, the first divided voltage −V1 input to a non-inverted terminal of the first error amplifier 4 is increased. Then, an output voltage of the first error amplifier 4 increases so that a gate voltage of the NMOS transistor M6 is increased. When the gate voltage of the NMOS transistor M6 increases, the drain current of the NMOS transistor M6 increases, resulting in increase of the voltage V3. As a result, similarly to the case within the operating range "B", a pulse width of the low level portion of the pulse signal Spwm output from the PWM comparator 8 increases. The control circuit 11 increases each ratio of the low level portion of the control signal SW1 and the high level portion of the control signal SW2 so that the sum of the absolute values (Vo2+Vo1) of the negative voltage −Vo1 and the positive voltage Vo2 is increased. Within the operating range "D", the control circuit 11 keeps the NMOS transistors M5a and M5b off so that the fifth switch is turned off.

The operating range "E" represents an operation where the negative voltage −Vo1 is decreased for some reason. When the negative voltage −Vo1 is decreased, an output voltage V4 of the first comparator 6 is inverted and becomes a low level. The control circuit 11 turns the third switch M3 off, and turns the NMOS transistors M5a and M5b turned on only while the first switch M1 is off so as to stop supplying energy to the capacitor C1. Accordingly, the negative voltage −Vo1 is increased. Further, the first divided voltage −V1 input to a non-inverted terminal of the first error amplifier 4 is decreased. Then, the output voltage of the first error amplifier 4 decreases so that a gate voltage of the NMOS transistor M6 is decreased. When the gate voltage of the NMOS transistor M6 decreases, the drain current of the NMOS transistor M6 decreases, resulting in decrease of the voltage V3. As a result, similarly to the case of the operating range "C", a pulse width of the low level of the pulse signal Spwm output from the PWM comparator 8 decreases. The control circuit 11 decreases each ratio of the low level portion of the control signal SW1 and the high level portion of the control signal SW2 so that the sum of the absolute values (Vo2+Vo1) of the negative voltage −Vo1 and the positive voltage Vo2 is decreased.

The operating range "F" represents an operation where the negative voltage −Vo1 is increased and the positive voltage Vo2 is decreased for some reason. When the negative voltage −Vo1 is increased, the voltage V3 increases as described for the operating range "D". Further, when the positive voltage Vo2 decreases, the voltage V3 increases as described for the operating range "B". As described for the operating ranges "B" and "D", the low level portion of the pulse signal Spwm output from the PWM comparator 8 increases in width. The control circuit 11 increases each ratio of the low level portion of the control signal SW1 and the high level portion of the control signal SW2 so that the sum of the absolute values (Vo2+Vo1) of the negative voltage −Vo1 and the positive voltage Vo2 is increased.

The operating range "G" represents an operation where the negative voltage −Vo1 is decreased and the positive voltage Vo2 is increased for some reason. When the negative voltage −Vo1 is decreased, an output voltage of the first comparator 6 is inverted and becomes a low level as described for the operating range "E". Further, when the positive voltage Vo2 is increased, an output voltage of the second comparator 7 is inverted and becomes a low level as described for the operating range "C". The control circuit 11 turns the second switch M2 on, the third and fourth switches M3 and M4 off, and the NMOS transistors M5a and M5b on only while the first switch M1 is off. As a result, supply of energy toward the negative voltage output terminal OUT1 and the positive voltage output terminal OUT2 is stopped. Accordingly, the negative voltage −Vo1 increases and the positive voltage Vo2 decreases so that the negative voltage −Vo1 and the positive voltage Vo2 return to predetermined voltages, respectively. Energy stored in the inductor L1 during the operating range "G" is discharged through the second switch M2, and the NMOS transistors M5a and M5b which are on.

The operating range "H" represents an operation where both the negative voltage −Vo1 and the positive voltage Vo2 are increased. When the negative voltage −Vo1 is increased, the voltage V3 increases as described for the operating ranges "D" and "F". Further, when the positive voltage Vo2 increases, the voltage V3 decreases as described for the operating ranges "C" and "G". For this reason, an actual change in the voltage V3 is a difference value of each voltage change of the negative voltage −Vo1 and the positive voltage V02.

Further, when the positive voltage Vo2 is increased, an output voltage V5 of the second comparator 7 is inverted and becomes a low level. As described for the operating ranges "C" and "G", the control circuit 11 turns the second switch M2 on and the fourth switch M4 off. Accordingly, supply of energy to the capacitor C2 is stopped. Then, the positive voltage Vo2 is decreased. Further, the control circuit 11 controls the on-duty cycle of the first switch M1 so that the sum of the absolute values (Vo2+Vo1) of the negative voltage −Vo1 becomes a predetermined voltage in accordance with the change of the voltage V3.

The operating range "I" represents an operation where both the negative voltage −Vo1 and the positive voltage Vo2 are decreased.

When the negative voltage −Vo1 is decreased, the voltage V3 decreases as described for the operating ranges "E" and "G". Further, when the positive voltage Vo2 decreases, the voltage V3 increases as described for the operating ranges "B" and "F". For this reason, an actual change in the voltage V3 is a difference value of each voltage change of the negative voltage −Vo1 and the positive voltage Vo2.

Further, when the negative voltage −Vo1 is decreased, an output voltage V4 of the first comparator 6 is inverted and becomes a low level. As described for the operating ranges "E" and "G", the control circuit 11 turns the third switch M3 off and the NMOS transistors M5a and M5b on only while the first switch M1 is off. Accordingly, it is stopped to supply energy to the capacitor C1. Then, the negative voltage −Vo1 is increased. Further, the control circuit 11 controls the on-duty cycle of the first switch M1 so that the summation of the absolute values (Vo2+Vo1) of the negative voltage −Vo1 becomes a predetermined voltage in accordance with the change of the voltage V3.

Figure 5:
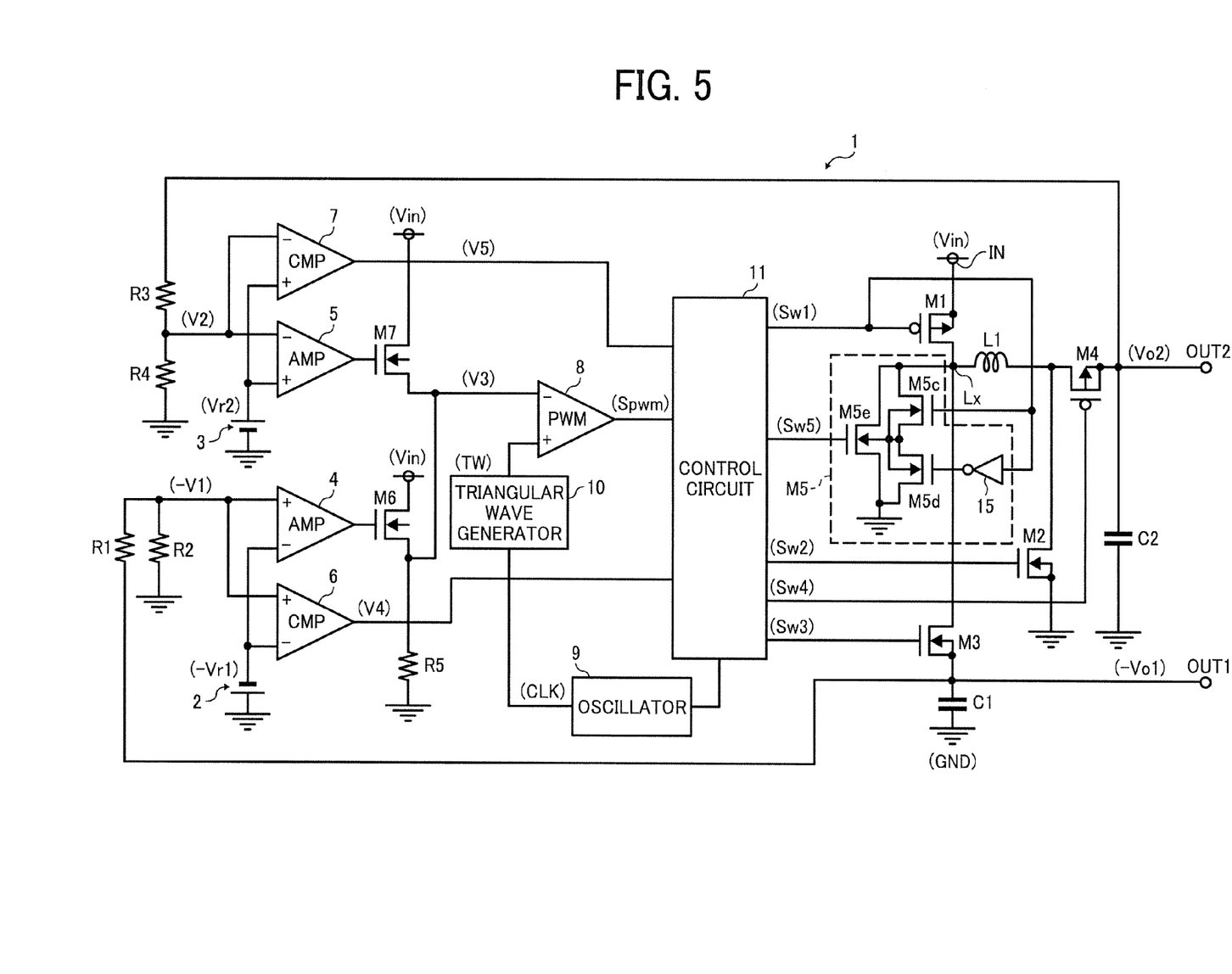
FIGS. 5 and 6 show other switching regulators according to the first exemplary embodiment.

In FIG. 3, the fifth switch M5 is comprised of the NMOS transistors M5a and M5b. Alternatively, however, the fifth switch M5 may be comprised of NMOS transistors M5c and M5d and an inverter 15 as shown in FIG. 5. The NMOS transistors M5c and M5d and the inverter 15 form a connection exchange circuit.

In FIG. 5, between the connection node Lx and ground, the NMOS transistor M5e is connected, and a series circuit comprising the NMOS transistors M5c and M5d is connected in parallel to the NMOS transistor M5e.

The control signal SW1 is input to a gate of the NMOS transistor M5c, and a control signal SW5 is input to a gate of the NMOS transistor M5e. The control signal SW1 is inverted by the inverter 15, and is input to a gate of the NMOS transistor M5d. Further, substrate gates of the NMOS transistors M5c, M5d and M5e are connected in common, and a connection node of the substrate gates is connected to a connection node between the NMOS transistors M5c and M5d.

When the control signal SW1 is a low level, the first switch M1 is on so that a drain voltage of the NMOS transistor M5e becomes almost equal to the input voltage Vin. Since the NMOS transistor M5c is off and the NMOS transistor M5d is on, there is no current flow through a parasitic diode of the NMOS transistor M5e when the NMOS transistor M5e is off.

When the control signal SW1 is a high level, the drain voltage of the NMOS transistor M5e becomes a negative voltage. Accordingly, the NMOS transistor M5c is on and the NMOS transistor M5d is off so that there is no current flow through a parasitic diode of the NMOS transistor M5e. As described above, the NMOS transistors M5c and M5d are employed only to switch the connection of the substrate gates of the NMOS transistor M5e. Therefore, the NMOS transistors M5c and M5d can be smaller than the NMOS transistor M5e which allows a large current. Consequently, it is possible to obtain a smaller chip in comparison to the circuitry of FIG. 3.

In the circuitry of FIG. 3, a parasitic diode of the first switch M1 is connected in the same direction as a current flowing from the drain to the substrate gate of the first switch M1. Accordingly, when the positive voltage Vo2 is larger than the input voltage Vin where the substrate gate is connected to a source of the first switch M1, a reverse current may start to flow toward an input voltage terminal IN at zero current flowing through the inductor L1. More specifically, the charge stored in the capacitor C2 may flow in a reverse direction through the fourth switch M4, the inductor L1, and a parasitic diode of the first switch M1 even when the first switch M1 is off. Thus, when the positive voltage Vo2 is larger than the input voltage Vin, the reverse current may flow depending on the condition of the inductor L1, resulting in decrease of power conversion efficiency.

Figure 6:
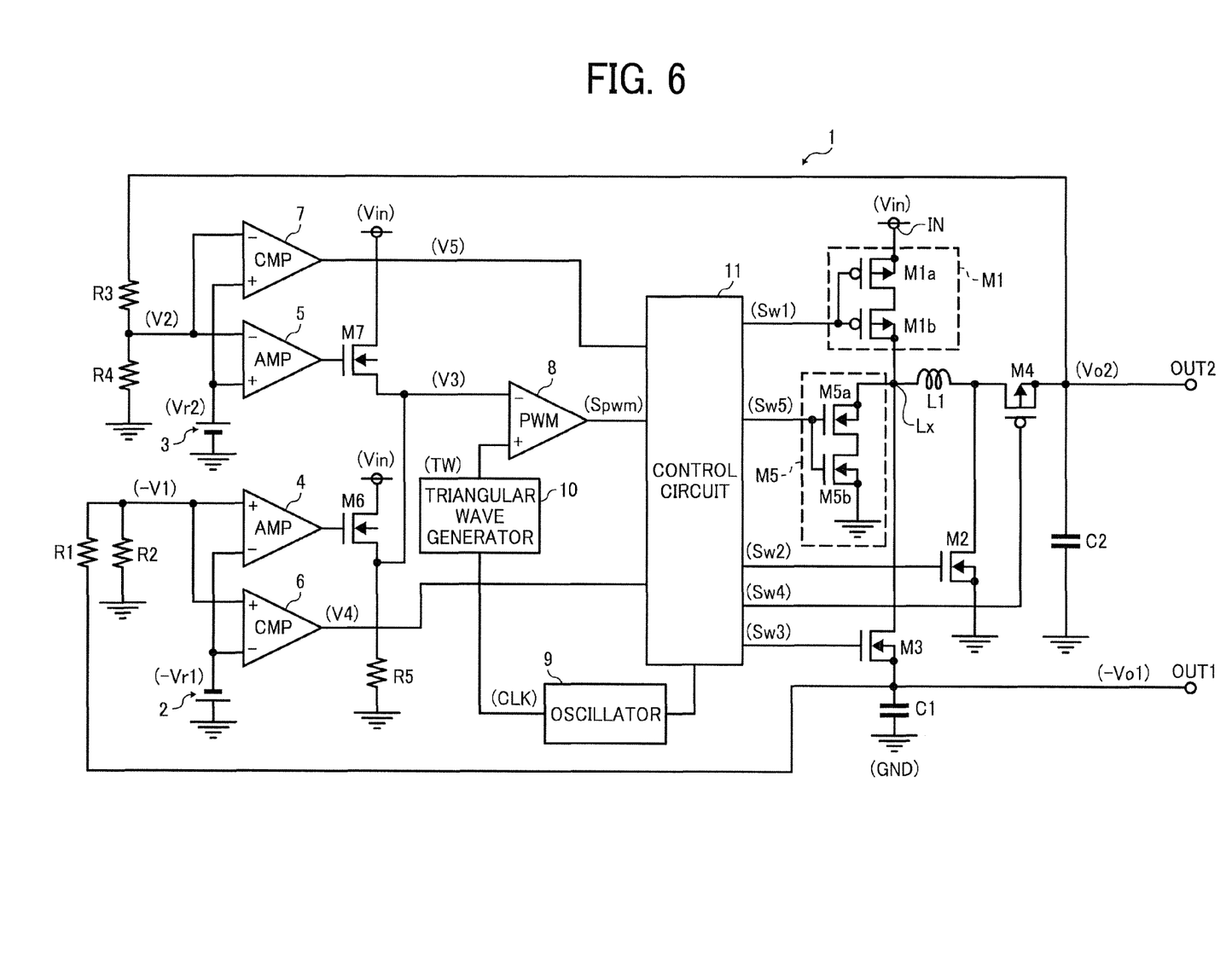

In another circuitry shown in FIG. 6, PMOS transistors M1a and M1b connected in series form a first switch M1, and the control signal SW1 is input to each gate of the PMOS transistors M1a and M1b. The input terminal IN is connected to a substrate gate of the PMOS transistor M1a, and the connection node Lx is connected to a substrate gate of the PMOS transistor M1b. With these connections, it is possible to avoid the reverse current due to the parasitic diode of the first switch M1. As a result, it is possible to prevent the power conversion efficiency from decreasing. Further, the substrate gate of the PMOS transistor M1a may be connected to a drain of the PMOS transistor M1a, and the substrate gate of the PMOS transistor M1b may be connected to a source of the PMOS transistor M1b.

As described, the switching regulator according to the first example embodiment can generate both the positive and the negative voltage from the single input voltage Vin that is supplied from a single power source. Further, it is possible to achieve high power conversion efficiency by performing a synchronous rectification operation.

In the first example embodiment, a single PWM comparator controls the summation of the absolute values (Vo2+Vo1) of the negative voltage −Vo1 and the positive voltage Vo2. Accordingly, it is possible to control so that each output voltage, that is, the negative voltage −Vo1 or the positive voltage Vo2, can be set to any voltage, respectively.

Second Example Embodiment

In FIG. 3, a synchronous rectification switching regulator is illustrated as an example of the first example embodiment. In a switching regulator according to a second example embodiment, the third and fourth switches M3 and M4 are replaced by diodes. The switching regulator according to the second example embodiment forms an asynchronous rectification switching regulator.

Figure 7:
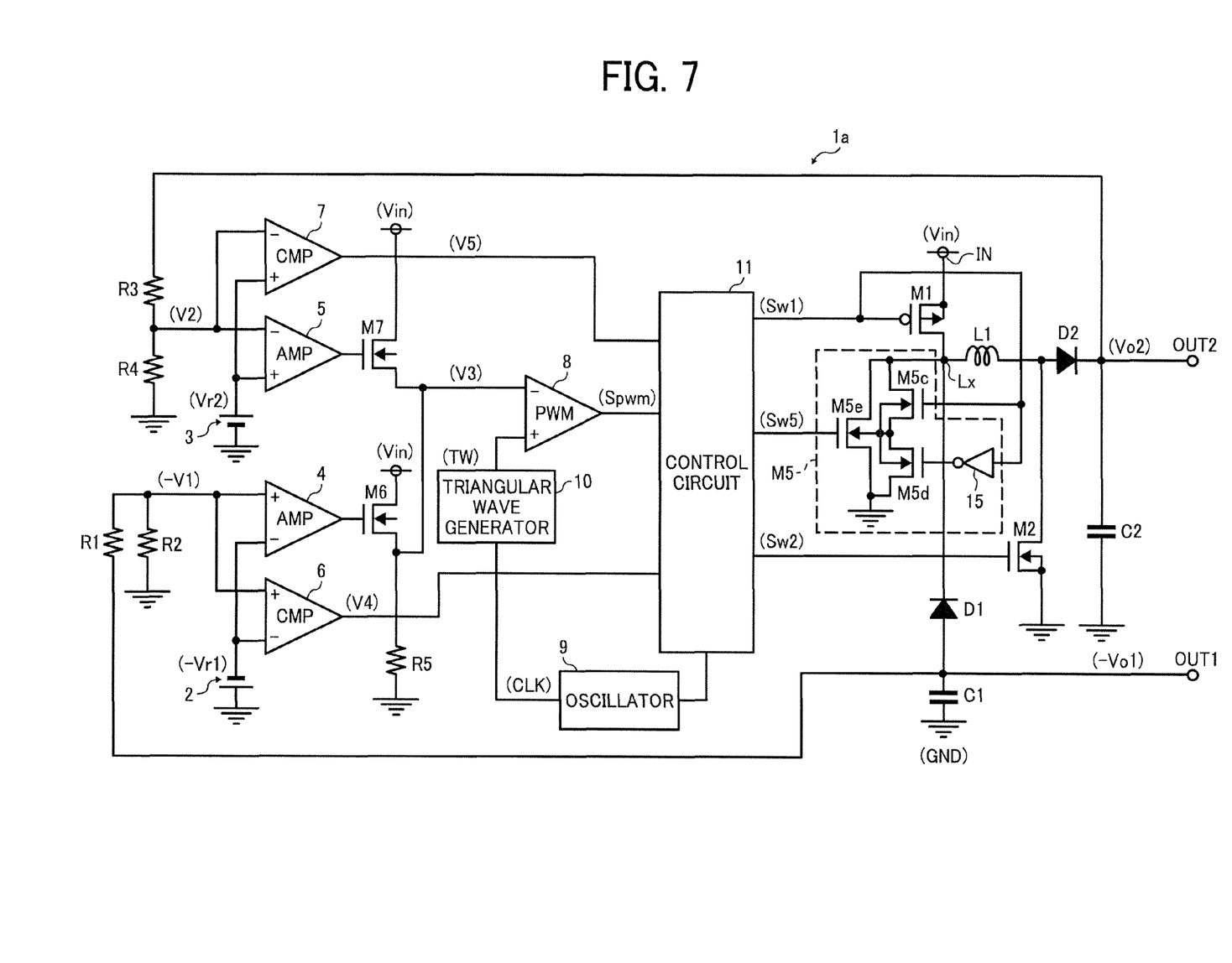
FIG. 7 is a switching regulator according to a second exemplary embodiment.

FIG. 7 is a switching regulator according to the second example embodiment. The switching regulator 1a shown in FIG. 7 differs from the switching regulator 1 shown in FIG. 5 in that the third switch M3 is replaced by a diode D1 and the fourth switch M4 is replaced by a diode D2.

The switching regulator 1 converts an input voltage Vin input at an input terminal IN to a predetermined negative voltage, and outputs the converted negative voltage as an output voltage −Vo1 from a negative output terminal OUT1. Further, the switching regulator 1 converts the input voltage Vin input at the input terminal IN to a predetermined positive voltage, and outputs the converted positive voltage as an output voltage Vo2 from a positive output terminal OUT2.

The switching regulator 1a includes an inductor L1, a first, third and fifth switches M1, M3 and M5, diodes D1 and D2, resistors R1, R2 and R3, an output capacitors C1 and C2, a first and second reference voltage generators 2 and 3, a first and second error amplifiers 4 and 5, a first and second comparators 6 and 7, a PWM comparator 8, an oscillator 9, a triangular wave generator 10, a control circuit 11, and NMOS transistors M6 and M7. The diode D1 forms a first rectification element, and the diode D2 forms a second rectification element. Excepting the inductor L1 and the capacitors C1 and C2, all the circuit units of the switching regulator 1a may be integrated on a single chip.

A cathode of the diode D1 is connected to the connection node Lx, and an anode of the diode D1 is connected to the connection node between the negative voltage output terminal OUT1 and the capacitor C1. A cathode of the diode D2 is connected to the connection node between the positive voltage output terminal OUT2 and the capacitor C2, and an anode of the diode D2 is connected to the connection node between the inductor L1 and the second switch M2. Accordingly, the switching regulator 1a is not a synchronous rectification switching regulator. When the negative and positive output voltages −Vo1 and Vo2 are large enough, decrease of power conversion efficiency is small with this circuit configuration. Further, the positive output voltages Vo2 can be set to a smaller voltage than the input voltage Vin similarly to the switching regulator according to the first example embodiment. In addition, it is possible to simplify the circuit because the control signals SW3 and SW4 output from the control circuit 11 are not necessary. Further, a reverse current from the positive output voltages Vo2 to the input voltage Vin can be prevented by the diode D2. Therefore, it is not necessary that the first switch M1 be formed of two PMOS transistors as shown in FIG. 6.

In the switching regulator according to the second example embodiment, the third and fourth switches M3 and M4 are replaced by diodes. Alternatively, however, one of the third and fourth switches M3 and M4 may be replaced by a diode.

In FIG. 7, the circuitry is modified from the circuitry of FIG. 5. The concept of the disclosure in FIG. 7 is also applicable to the circuitries of FIGS. 3 and 6. Accordingly, the switching regulator may be arranged to form an asynchronous rectification switching regulator by replacing the third and/or fourth switches M3 and M4 by diodes.

In each switching regulator according to the first and second example embodiments, MOS transistors are used as the switches. However, bipolar transistors may be used by replacing the MOS transistors. In this case, the PMOS transistors are replaced by pnp transistors, and the NMOS transistors are replaced by npn transistors. Using the bipolar transistors instead of the MOS transistors, the fifth switch M5 in FIGS. 3, 5, 6 and 7 is replaced by an npn transistor connected between the connection node Lx and ground. Further, the first switch M1 in FIGS. 3, 5, 6 and 7 is replaced by a pnp transistor connected between the input terminal IN and the connection node Lx.

As can be appreciated by those skilled in the art, numerous additional modifications and variations of the foregoing embodiments are possible in light of the above teachings. It is therefore to be understood that, within the scope of the appended claims, the disclosure of this patent specification may be practiced otherwise than as specifically described herein.

What is claimed is:

1. A switching regulator, comprising: an inductor; a first switch connected between an input terminal and one terminal of the inductor, and configured to switch to create a conduction state or a shutdown state in accordance with a first control signal; a second switch connected between another terminal of the inductor and ground, and configured to switch to create a conduction state or a shutdown state in accordance with a second control signal; a first rectifier to allow current flowing from a negative Voltage output terminal to a connection node between the inductor and the first switch; a second rectifier to allow current flowing from a positive voltage output terminal to a connection node between the inductor and the second switch; a third switch connected between a connection node between the inductor and the first switch and ground, and configured to switch to create a conduction state or a shutdown state in accordance with a third control signal; a first capacitor connected between the negative voltage output terminal and ground; second capacitor connected between the positive voltage output terminal and ground; and a controller configured to control a switching operation of the first, second and third switches to make each voltage at the negative and positive voltage output terminals corresponding predetermined voltages, respectively, wherein the control circuit switches the first and second switches on and off simultaneously to make a sum of absolute values of both voltages at the negative and positive voltage output terminals a predetermined voltage value.

2. The switching regulator of claim 1,
wherein the third switch is shut off and each on-duty cycle of the first and second switches is made larger to increase a sum of absolute values of voltages at the negative voltage terminal and a positive voltage terminal so that the sum of absolute values of voltages becomes a predetermined voltage when the negative voltage becomes more than a first predetermined voltage and/or the positive voltage becomes less than a second predetermined voltage.

3. The switching regulator of claim 1,
wherein the third switch is turned on while the first switch is off and each on-duty cycle of the first and second switches is made smaller to decrease a sum of absolute values of voltages at the negative voltage terminal and a positive voltage terminal so that the sum of absolute values of voltages becomes a predetermined voltage when the negative voltage becomes less than a first predetermined voltage.

4. The switching regulator of claim 1,
wherein the second switch is turned on, the third switch is off, and each on-duty cycle of the first switch is made smaller to decrease a sum of absolute values of voltages at the negative voltage terminal and a positive voltage terminal so as to become a predetermined voltage when the positive voltage becomes more than a second predetermined voltage.

5. The switching regulator of claim 1,
wherein the controller further comprises:
a first error amplifier configured to amplify a voltage difference between a first proportional voltage proportional to the negative voltage and a predetermined first reference voltage, and to output an amplified voltage;
a second error amplifier configured to amplify a voltage difference between a second proportional voltage proportional to the positive voltage and a predetermined second reference voltage, and to output an amplified voltage;
an adder configured to add each output voltage of the first and second error amplifiers, and to output a summed voltage;
a PWM comparator configured to generate a pulse signal by performing pulse width modulation (PWM) with the summed voltage output from the adder, and to output the pulse signal;
a first comparator configured to compare the first proportional voltage and the first reference voltage, generate a comparison result signal, and output the comparison result signal;

a second comparator configured to compare the second proportional voltage and the second reference voltage, generate a comparison result signal, and output the comparison result signal; and a control circuit configured to control operations of the first, second and third switches based on output signals from the PWM comparator and the first and second comparators.

6. The switching regulator of claim 1, wherein the first rectifier is connected between a connection node of the inductor and the first switch, turns on or off in accordance with a fourth control signal, and forms a fourth switch, and wherein the second rectifier is connected between a connection node of the inductor and the second switch, turns on or off in accordance with a fifth control signal, and forms a fifth switch, and wherein the controller turns the first and second switches on and off simultaneously, and turns the fourth and fifth switches on and off complementally with corresponding first and second switches, so that a sum of absolute values of voltages at the negative voltage terminal and a positive voltage terminal becomes a predetermined voltage.

7. The switching regulator of claim 6, wherein the controller turns the fourth switch off when the negative voltage becomes less than a first predetermined voltage, and turns the fifth switch off when the positive voltage becomes more than a second predetermined voltage.

8. The switching regulator of claim 6, wherein the controller further comprises:

a first error amplifier configured to amplify a voltage difference between a first proportional voltage proportional to the negative voltage and a predetermined first reference voltage, and to output an amplified voltage;

a second error amplifier configured to amplify a voltage difference between a second proportional voltage proportional to the positive voltage and a predetermined second reference voltage, and to output an amplified voltage;

an adder configured to add each output voltage of the first and second error amplifiers, and to output a summed voltage;

a PWM comparator configured to generate a pulse signal by performing a PWM modulation with the summed voltage output from the adder, and to output the pulse signal;

a first comparator configured to compare the first proportional voltage and the first reference voltage, generate a comparison result signal, and output the comparison result signal;

a second comparator configured to compare the second proportional voltage and the second reference voltage, generate a comparison result signal, and output the comparison result signal; and a control circuit configured to control operations of the first, second, fifth and third switches based on output signals from the PWM comparator and the first and second comparators.

9. The switching regulator of claim 1, wherein the first rectifier is connected between a connection node of the inductor and the first switch, turns on or off in accordance with a fourth control signal, and forms a third switch, and wherein the controller turns the first and second switches on and off simultaneously, and turns the third switch on and off complementally with the first switch, so that a sum of absolute values of voltages at the negative voltage terminal and a positive voltage terminal becomes a predetermined voltage.

10. The switching regulator of claim 9, wherein the controller turns the fourth switch off when the negative voltage becomes less than a first predetermined voltage.

11. The switching regulator of claim 9, wherein the controller further comprises:

a first error amplifier configured to amplify a voltage difference between a first proportional voltage proportional to the negative voltage and a predetermined first reference voltage, and to output an amplified voltage;

a second error amplifier configured to amplify a voltage difference between a second proportional voltage proportional to the positive voltage and a predetermined second reference voltage, and to output an amplified voltage;

an adder configured to add each output voltage of the first and second error amplifiers, and to output a summed voltage;

a PWM comparator configured to generate a pulse signal by performing PWM with the summed voltage output from the adder, and to output the pulse signal;

a first comparator configured to compare the first proportional voltage and the first reference voltage, generate a comparison result signal, and output the comparison result signal;

a second comparator configured to compare the second proportional voltage and the second reference voltage, generate a comparison result signal, and output the comparison result signal; and a control circuit configured to control operations of the first, second, and third switches based on output signals from the PWM comparator and the first and second comparators.

12. The switching regulator of claim 1, wherein the second rectifier is connected between a connection node of the inductor and the second switch, turns on or off in accordance with a fifth control signal, and forms a fifth switch, and wherein the controller turns the first and second switches on and off simultaneously, and turns the fifth switch on and off complementally with the second switch so that a sum of absolute values of voltages at the negative voltage terminal and a positive voltage terminal becomes a predetermined voltage.

13. The switching regulator of claim 12, wherein the controller turns the fifth switch off when the positive voltage becomes more than a second predetermined voltage.

14. The switching regulator of claim 12, wherein the controller further comprises:

a first error amplifier configured to amplify a voltage difference between a first proportional voltage proportional to the negative voltage and a predetermined first reference voltage, and to output an amplified voltage;

a second error amplifier configured to amplify a voltage difference between a second proportional voltage proportional to the positive voltage and a predetermined second reference voltage, and to output an amplified voltage;

an adder configured to add each output voltage of the first and second error amplifiers, and to output a summed voltage;

a PWM comparator configured to generate a pulse signal by performing PWM with the summed voltage output from the adder, and to output the pulse signal;

a first comparator configured to compare the first proportional voltage and the first reference voltage, generate a comparison result signal, and output the comparison result signal;

a second comparator configured to compare the second proportional voltage and the second reference voltage, generate a comparison result signal, and output the comparison result signal; and a control circuit configured to control operations of the first, second, firth and third switches based on output signals from the PWM comparator, the first and second comparators.

15. The switching regulator of claim 5,
wherein the first and second comparators include hysteresis mechanisms.

16. The switching regulator of claim 1,
wherein the third switch is formed of two NMOS transistors connected in series,
and wherein a substrate gate is connected to a drain in one of the NMOS transistors, and a substrate gate is connected to a source in another one of the NMOS transistors.

17. A control method used in a switching regulator generating and outputting a predetermined positive voltage and negative voltage from an input voltage input at an input terminal, and including: an inductor; a first switch connected between an input terminal and one terminal of the inductor, and configured to switch to create a conduction state or a shutdown state in accordance with a first control signal; a second switch connected between another terminal of the inductor and ground, and configured to switch to create a conduction state or a shutdown state in accordance with a second control signal; a first rectifier to allow current flowing from a negative voltage output terminal to a connection node between the inductor and the first switch; a second rectifier to allow current flowing from a positive voltage output terminal to a connection node between the inductor and the second switch; a third switch connected between a connection node between the inductor and the first switch and ground, and configured to switch to create a conduction state or a shutdown state in accordance with a third control signal; a first capacitor connected between the negative voltage output terminal and ground; and a second capacitor connected between the positive voltage output terminal and ground, the control method comprising: switching the first and second switches on and off simultaneously to make a sum of absolute values of both voltages at the negative and positive voltage output terminals a predetermined voltage value; and controlling operations of the first, second and third switches to make each voltage at the negative and positive voltage output terminals corresponding predetermined first and second voltages, respectively.

18. The control method of claim 17,
wherein the third switch is shut off and each on-duty cycle of the first and second switches is made larger to increase a sum of absolute values of voltages at the negative voltage terminal and a positive voltage terminal so that the sum of absolute values of voltages become a predetermined voltage when the negative voltage becomes more than a first predetermined voltage and/or the positive voltage becomes less than a second predetermined voltage.

19. The control method of claim 17,
wherein the third switch is turned on while the first switch is off and each on-duty cycle of the first and second switches is made smaller to decrease a sum of absolute values of voltages at the negative voltage terminal and a positive voltage terminal so that the sum of absolute values of voltages becomes a predetermined voltage when the negative voltage becomes less than a first predetermined voltage.

20. The control method of claim 17, wherein the second switch is turned on, the third switch is off, and each on-duty cycle of the first switch is made smaller to decrease a sum of absolute values of voltages at the negative voltage terminal and a positive voltage terminal so as to become a predetermined voltage when the positive voltage becomes more than a second predetermined voltage.

* * * * *